United States Patent [19]

Connell

[11] Patent Number: 4,885,952
[45] Date of Patent: Dec. 12, 1989

[54] CYLINDRICAL TAPPET

[76] Inventor: Calvin C. Connell, 1618 Twelve Oaks Way, N. Palm Beach, Fla. 33408

[21] Appl. No.: 185,964

[22] Filed: Apr. 25, 1988

Related U.S. Application Data

[63] Continuation-in-part of Ser. No. 545,117, Oct. 25, 1983, Pat. No. 4,739,675, which is a continuation of Ser. No. 206,841, Nov. 14, 1980, abandoned.

[51] Int. Cl.[4] .............................................. F16H 53/06
[52] U.S. Cl. .................................... 74/569; 123/90.48; 123/90.52
[58] Field of Search ............ 74/569; 123/90.52, 90.48, 123/90.15, 90.43

[56] References Cited

U.S. PATENT DOCUMENTS

| | | | |
|---|---|---|---|
| 1,061,700 | 5/1913 | Steinbecker | 123/90.48 |
| 1,339,276 | 5/1920 | Murphy | 74/569 X |
| 1,503,383 | 7/1924 | Sargent | 123/90.48 X |
| 1,658,319 | 2/1928 | Wineman | 123/90.48 X |
| 1,726,513 | 8/1929 | Johnson | 123/90.48 |
| 1,785,596 | 12/1930 | Petersen | 123/90.52 |
| 2,735,313 | 2/1956 | Dickson | 74/569 |
| 2,933,949 | 4/1960 | Bouwkamp | 74/569 |
| 3,066,659 | 12/1962 | Colton | 123/90.52 X |
| 4,387,674 | 6/1983 | Connell | 123/90.48 X |
| 4,549,509 | 10/1985 | Burtchell | 123/90.48 X |
| 4,739,675 | 4/1988 | Connell | 74/569 |

Primary Examiner—Rodney M. Lindsey
Attorney, Agent, or Firm—Lyman R. Lyon

[57] ABSTRACT

A tappet comprising a body portion, a cam follower shoe having an arcuate cam engaging sole, a pivot pin supporting the cam follower shoe for rotation on the body portion of said tappet, and a removable shim for moving said shoe relative to the axis of reciprocation of the body portion of said tappet to vary valve timing.

1 Claim, 1 Drawing Sheet

CYLINDRICAL TAPPET

CROSS REFERENCE TO RELATED APPLICATION

This application is a continuation-in-part of U.S. Ser. No. 545,117, filed Oct. 25, 1983, issued Apr. 26, 1988 as U.S. Pat. No. 4,739,675, which was a continuation of Ser. No. 206,841, filed Nov. 14, 1980, now abandoned.

BACKGROUND OF THE INVENTION

There is a need for a valve tappet for an internal combustion engine that maximizes flexibility of engine performance by permitting the adjustment of engine valve timing without necessitating camshaft change.

SUMMARY OF THE INVENTION

The disclosed tappet assembly is of three piece construction, namely, a tappet body, a shoe having arcuate cam engaging sole, and an axle pin for supporting the shoe on the tappet body. The tappet assembly exhibits unique features that solves the aforesaid problem by permitting selective offset of the shoe and therefore the arcuate sole thereof from the centerline of the tappet body. Thus, because the arcuate sole of the shoe is generated about an axis that extends at a right angle to the direction of shoe offset, timing of valve opening is altered. Advancement or retardation of the advent of fuel intake can be accomplished independently of other timing events and without changing the camshaft. Thus, the present invention permits engine torque to be modified for special applications or to meet special conditions.

DETAILED DESCRIPTION OF THE PREFERRED EMBODIMENT OF THE INVENTION

Figure 1:
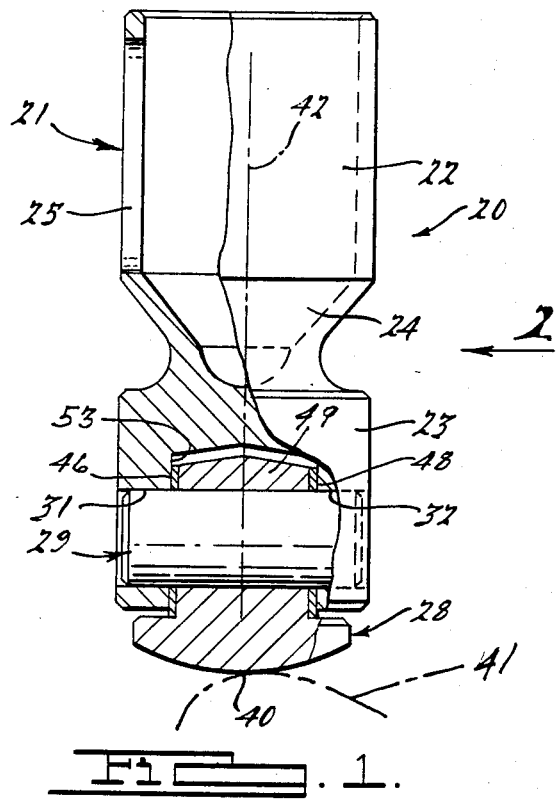
FIG. 1 is an elevational view of a tappet in accordance with the invention.
Figure 2:
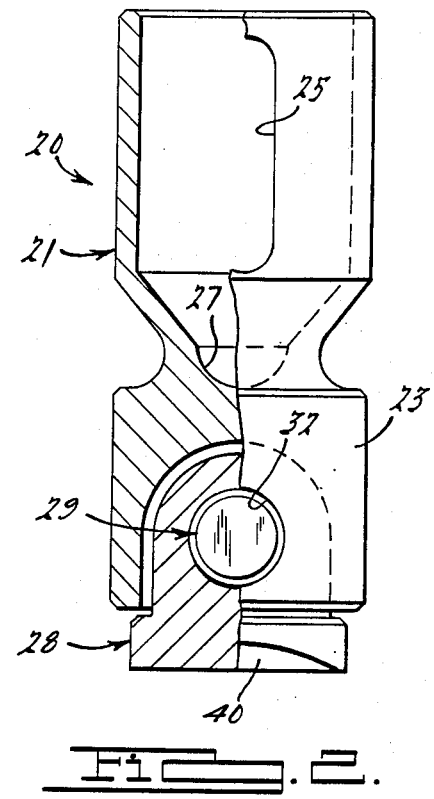
FIG. 2 is a view taken in the direction of the arrow "2" of FIG. 1.

As seen in FIG. 1, a tappet 20, in accordance with a constructed embodiment of the present invention, comprises a body portion 21 which has a generally hourglass shape consisting of a hollow upper cylindrical portion 22, a lower cylindrical portion 23, and an interconnecting tapered or necked down portion 24. The upper cylindrical portion 22 is formed with a longitudinally extending slot 25 in one side thereof for reception of a pin (not shown) in a cylinder block (not shown) for holding the tappet 20 against rotation. The intermediate tappet body portion 24 is formed with a spherical socket 27 which receives the lower end of a push rod (not shown).

A cam follower shoe 28, is supported for pivotal movement about an axis that extends normal to the axis of reciprocation of the tappet 20 by a pivot pin 29. The pin 29 is received in a pair of aligned bores 31 and 32 formed in the lower portion 23 of the tappet body 21.

Pivotal mounting of the shoe 28 insures full line contact area between an arcuate sole portion 40 thereof and a cam lobe 41 of the engine and minimizes cocking loads on the tappet 20. The arcuate sole portion 40 of the foot 28 increases the opening and closing velocity of a valve driven by the tappet 20 while maintaining generous cam lobe nose radius and eliminating concave or reverse cam lobe flanks.

In accordance with the instant invention, valve timing with a given camshaft may be readily varied by changing the position of the shoe 28 relative to a central axis 42 of the tappet 20.

Figure 3:
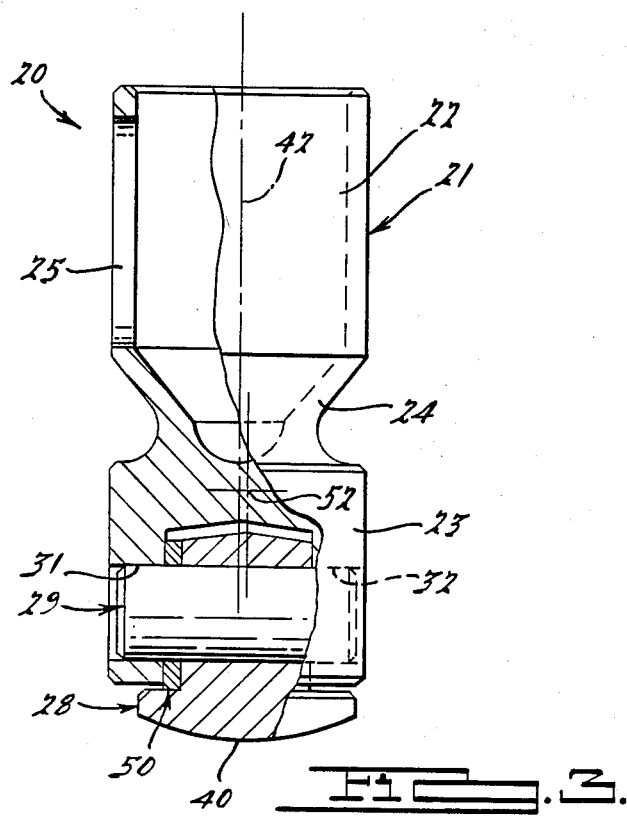
FIG. 3 is a view, similar to FIG. 1, with the tappet shoe shifted to the right.
Figure 4:
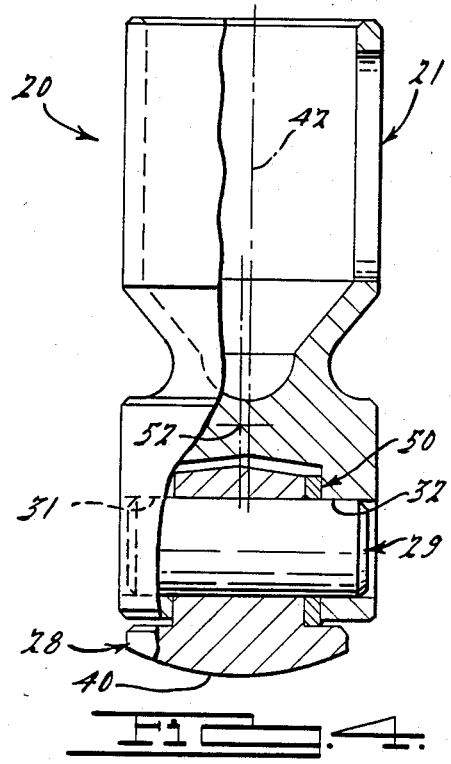
FIG. 4 is a view, similar to FIG. 1, with the tappet shoe shifted to the left.

As seen by comparing FIGS. 1 and 3, timing adjustment is achieved by removing a pair of relatively thin shims 46 and 48 from opposite sides of an upstanding leg portion 49 of the shoe 28. A relatively thick shim 50 is thereafter positioned about the pin 29 on one side of the shoe 28 thereby moving the center of generation 52 of the arcuate sole 40 thereon to the right as seen in FIG. 3. The leg portion 49 of the shoe 28 is narrower than a complementary slot 53 in the body portion 21 of the tappet 20 to accommodate either the shims 46 and 48 or the shim 50. Alternatively, the shim 50 can be positioned to the right of the shoe 28 as seen in FIG. 4 thereby moving the shoe 28 to the left. In this manner timing of valve opening is altered without requiring a cam change.

While the preferred embodiment of the invention has been disclosed, it should be appreciated that the invention is susceptible of modification without departing from the scope of the following claims.

I claim:

1. In a tappet for transmitting motion from a rotatable cam to a reciprocal valve of an internal combustion engine, said tappet comprising a cylindrical body portion adapted to be supported by said engine for reciprocation along a first axis, a cam follower shoe having an arcuate cam engaging sole engageable with a rotatable cam having an axis of rotation extending at a right angle to said first axis, and a pivot pin supporting the cam follower shoe of said tappet for rotation relative to the body portion thereof about a second axis extending at a right angle to the first axis of reciprocation of said tappet and to the axis of rotation of said cam, the improvement comprising;

a removable shim on said pivot pin between the shoe and body portion of said tappet, said shim effecting displacement of said shoe relative to the axis of reciprocation of the body portion of said tappet in a direction parallel to said second axis and at a right angle to the axis of rotation of said cam thereby to vary the relationship of said rotatable cam to the arcuate sole of the shoe on said cam follower shoe.

* * * * *